United States Patent
Lin et al.

(10) Patent No.: US 10,645,650 B2
(45) Date of Patent: May 5, 2020

(54) COMPUTER POWER SAVING METHOD AND COMPUTER WAKING METHOD

(71) Applicant: GIGA-BYTE TECHNOLOGY CO., LTD., New Taipei (TW)

(72) Inventors: Ko-Hui Lin, New Taipei (TW); Yi-Ming Teng, New Taipei (TW); Li-Te Lin, New Taipei (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 16/213,718

(22) Filed: Dec. 7, 2018

(65) Prior Publication Data
US 2020/0029277 A1 Jan. 23, 2020

(30) Foreign Application Priority Data
Jul. 20, 2018 (TW) .............................. 107125114 A

(51) Int. Cl.
*H04W 52/02* (2009.01)
*G06F 1/3209* (2019.01)
(Continued)

(52) U.S. Cl.
CPC ...... *H04W 52/0229* (2013.01); *G06F 1/3209* (2013.01); *G06F 1/3296* (2013.01); *H04W 52/0274* (2013.01)

(58) Field of Classification Search
CPC .......... H04W 52/0229; H04W 52/0274; G06F 1/3209; G06F 1/3296
(Continued)

(56) References Cited

U.S. PATENT DOCUMENTS

| 2001/0018329 A1 | 8/2001 | Tada et al. |
| 2006/0061951 A1* | 3/2006 | Hara ...................... G06F 1/1601 361/679.22 |

(Continued)

FOREIGN PATENT DOCUMENTS

| JP | 2007-133812 A | 5/2007 |
| JP | 2007-318651 A | 12/2007 |

(Continued)

OTHER PUBLICATIONS

TW Office Action in application No. 107125114 dated Feb. 25, 2019.
(Continued)

*Primary Examiner* — Inder P Mehra
(74) *Attorney, Agent, or Firm* — Maschoff Brennan

(57) ABSTRACT

A computer waking method applied to a computer having a Bluetooth signal receiving port, and with the computer waking method comprises: determining whether the computer receives a trigger instruction when a processor of the computer stops working and the computer is operated in a power saving mode; determining whether an intensity of a communication signal related to a registered mobile device obtained by the Bluetooth signal receiving port falls within an working intensity range; and enabling the processor to make the computer operate in a working mode when the computer receives the trigger instruction and the intensity of the communication signal falls within a working intensity range.

13 Claims, 7 Drawing Sheets

(51) Int. Cl.
*G06F 1/3234* (2019.01)
*G06F 1/3231* (2019.01)
*G06F 1/3296* (2019.01)

(58) Field of Classification Search
USPC .......................................................... 455/574
See application file for complete search history.

(56) References Cited

U.S. PATENT DOCUMENTS

| | | |
|---|---|---|
| 2007/0275660 A1 | 11/2007 | Sathath |
| 2010/0120406 A1 | 5/2010 | Banga et al. |
| 2011/0121928 A1* | 5/2011 | Qu .............................. G06F 1/26 336/65 |
| 2011/0185009 A1* | 7/2011 | Chang ..................... G06F 3/023 709/203 |
| 2011/0305337 A1 | 12/2011 | Devol et al. |
| 2012/0020265 A1 | 1/2012 | Wu et al. |
| 2012/0040623 A1* | 2/2012 | Liu ........................ G06F 1/3203 455/67.13 |
| 2013/0297958 A1 | 11/2013 | Siegel et al. |
| 2015/0187197 A1* | 7/2015 | Golomb ............. G08B 21/0205 340/686.1 |
| 2017/0214809 A1* | 7/2017 | Kato .................. H04N 1/00225 |
| 2018/0039321 A1 | 2/2018 | Tsuchiya et al. |
| 2018/0113654 A1* | 4/2018 | Yeung ................... G06F 3/1236 |
| 2018/0145754 A1* | 5/2018 | Bartley ............... G06F 13/4068 |

FOREIGN PATENT DOCUMENTS

| | | |
|---|---|---|
| JP | 2013-20606 A | 1/2013 |
| JP | 2016-19125 A | 2/2016 |
| JP | 2016-134726 A | 7/2016 |
| JP | 2016-162070 A | 9/2016 |
| JP | 2017-61086 A | 3/2017 |
| TW | 200924423 A | 6/2009 |
| TW | 201330569 A | 7/2013 |
| TW | 201337502 A | 9/2013 |
| TW | 201501692 A | 1/2015 |
| TW | 201638827 A | 11/2016 |

OTHER PUBLICATIONS

European Search Report issued in corresponding application No. 18210660.9, dated Jun. 25, 2019.

JP Office Action in Application No. 2018-233846 dated Dec. 17, 2019.

* cited by examiner

COMPUTER POWER SAVING METHOD AND COMPUTER WAKING METHOD

CROSS-REFERENCE TO RELATED APPLICATIONS

This non-provisional application claims priority under 35 U.S.C. § 119(a) on Patent Application No(s). 107125114 filed in Republic of China on Jul. 20, 2018, the entire contents of which are hereby incorporated by reference.

BACKGROUND OF THE INVENTION

Technical Field of the Invention

The present disclosure is related to an energy saving method, and more particularly to a computer power saving method and a computer waking method.

Description of the Related Art

A power consumption of an electronic product is one of important design factors. Every manufacturer wants his own electronic products to consume less power to increase the standby time for satisfying users' demands.

A user often leaves the computer temporarily without shutting down the computer because the user needs to handle other things temporarily. However, once this situation occurs frequently, the computer will lose more power. Therefore, the computer is usually set in a power-saving mode to stop supplying power to some devices of the computer for saving powers.

If a user wants to wake the computer from the power-saving mode, the user must operate a keyboard, a mouse or a power switch. Therefore, it is not convenient for a user to switch a computer from a power-saving mode to a working mode.

In view of the foregoing situations, there is indeed a need for an improved computer power saving method and a computer waking method, which can improve above shortcomings.

SUMMARY OF THE INVENTION

One embodiment of the present disclosure provides a computer waking method, applied to a computer having a Bluetooth signal receiving port, and with the computer waking method comprises: determining whether the computer receives a trigger instruction when a processor of the computer stops working and the computer is operated in a power saving mode; determining whether an intensity of a communication signal related to a registered mobile device obtained by the Bluetooth signal receiving port falls within an working intensity range; and enabling the processor to make the computer operate in a working mode when the computer receives the trigger instruction and the intensity of the communication signal falls within a working intensity range.

One embodiment of the present disclosure provides a computer power saving method, applied to a computer having a Bluetooth signal receiving port, and with the power saving method comprises: communicating a mobile device with a computer by a Bluetooth protocol of the Bluetooth signal receiving port and registering the mobile device in the computer; determining whether an intensity of a communication signal related to a registered mobile device obtained by the Bluetooth signal receiving port falls within a working intensity range when a processor of the computer works and the computer is in a working mode; stopping the processor to make the computer operate in a power saving mode when the intensity of the communication signal fails to fall within a working intensity range; determining whether the computer receives a trigger instruction when the processor of the computer stops working and the computer is in a power saving mode; determining whether an intensity of a communication signal related to a registered mobile device obtained by the Bluetooth signal receiving port falls within an working intensity range; and enabling the processor to make the computer operate in the working mode when the computer receives the trigger instruction and the intensity of the communication signal fails to fall within the working intensity range.

The above description of the summary and embodiments described as follow intend to illustrate and explain spirits and principles of the present invention and further explain a scope of the present invention.

BRIEF DESCRIPTION OF THE DRAWINGS

The present disclosure will become more fully understood from the detailed description given herein below and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
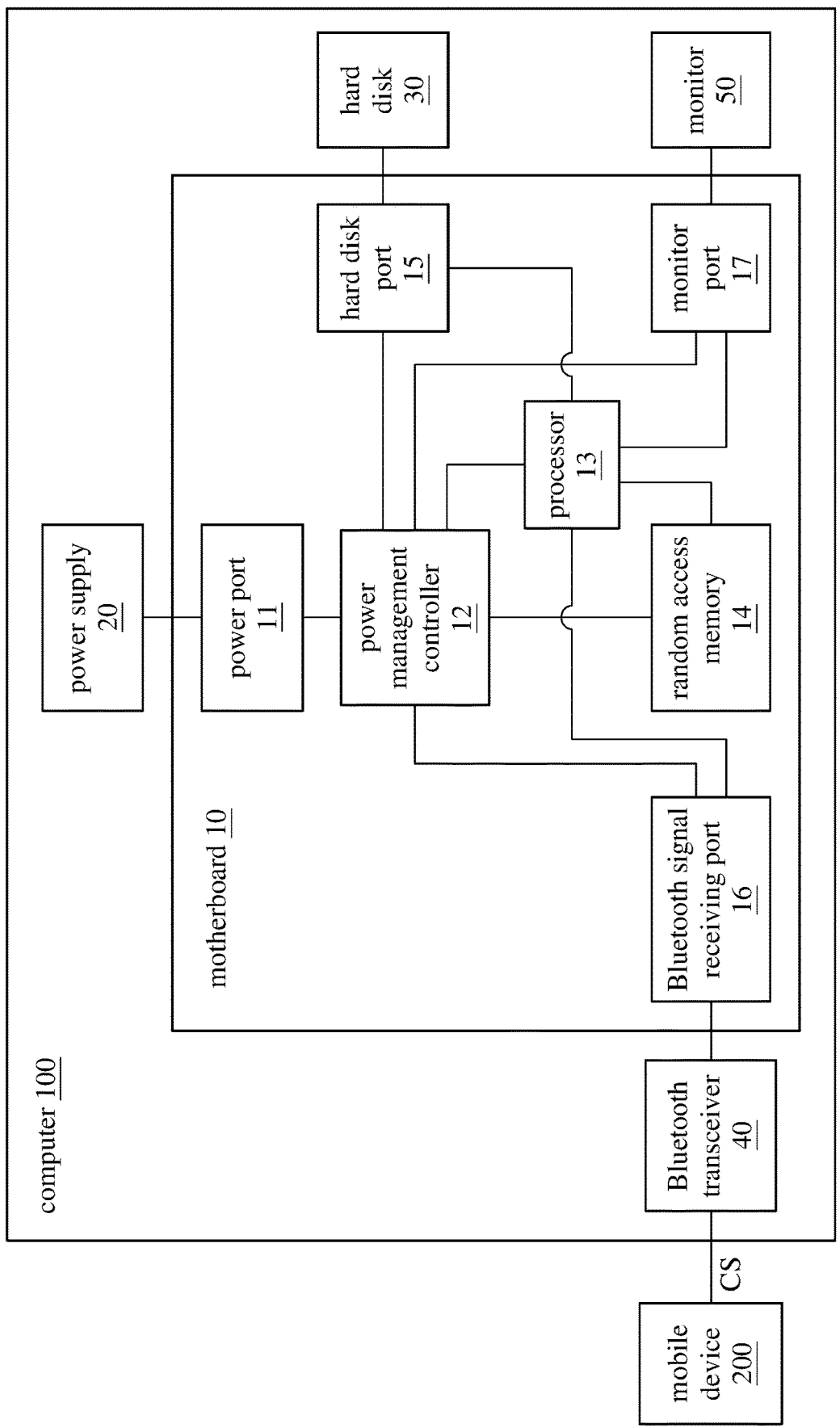
FIG. 1 is a hardware architecture diagram of a computer with a power saving function according to one embodiment of the present disclosure.

FIG. 1 is a hardware architecture diagram of a computer with a power saving function according to one embodiment of the present disclosure. As shown in FIG. 1, the computer 100 includes a motherboard 10, a power supply 20, a hard disk 30, a Bluetooth transceiver 40, and a monitor 50. In this embodiment, the motherboard 10 conforms to Advanced Configuration and Power Interface (ACPI), and the motherboard 10 conforming to APCI has S0 mode, S1 mode (Standby state), S2 mode, and S3 mode (Suspend to RAM), S4 mode (Hibernate mode) and S5 mode, where S0 mode is a working mode, S1 mode to S4 mode are several power saving modes, wherein S5 mode is a shutdown mode. The power supply 20, the hard disk 30, the Bluetooth signal transceiver 40, and the monitor 50 are electrically connected with the motherboard 10 respectively. The power supply 20 supplies power to the motherboard 10, and the motherboard 10 distributes the power provided by the power supply 20 to the hard disk 30, the Bluetooth signal transceiver 40, and the monitor 50 for use. The hard disk 30 is a non-volatile storage device, data stored in the hard disk 30 is not lost when the computer 100 is turned off. The Bluetooth signal transceiver 40 is configured to receive a communication signal CS sent by a user's mobile device 200 and to determine the intensity of the communication signal CS, and the communication signal CS is a Bluetooth signal.

The motherboard 10 includes a power port 11, a power management controller 12, a processor 13, a random access memory 14 (RAM), a hard disk port 15, a Bluetooth signal receiving port 16, and a monitor port 17. The power port 11 is electrically connected with the power supply 20 and the power management controller 12, and the power port 11 is configured to transmit the power generated by the power supply 20 to the power management controller 12. The power management controller 12 is electrically connected with the processor 13, the random access memory 14, the hard disk port 15, the Bluetooth signal receiving port 16, and the monitor port 17 respectively, and the power management controller 12 is configured to manage power required for operations of the processor 13, the random access memory 14, the hard disk port 15, the Bluetooth signal receiving port 16, and the monitor port 17. Except the processor 13 is electrically connected with the power management controller 12, the processor 13 is further electrically connected with the random access memory 14, the hard disk port 15, the Bluetooth signal receiving port 16, and the monitor port 17, and the processor 13 is configured to execute program instructions stored in the random access memory 14. The random access memory 14 is configured to store program instructions and data required for executing the program instructions temporarily. Since the random access memory 14 is a volatile memory, it is necessary to continuously supply power to the random access memory 14 to save the data and the program instructions in the random access memory 14. Except the hard disk port 15 is electrically connected with power management controller 12, the hard disk port 15 is further electrically connected with a hard disk 30. In this embodiment, the Bluetooth signal receiving port 16 is a USB port. In other embodiments, the Bluetooth signal receiving port 16 may also be other kinds of connecting interfaces, such as a PCI Express port or a Mini PCI Express port. Except the Bluetooth signal receiving port 16 is electrically connected with the power management controller 12, the Bluetooth signal receiving port 16 is further electrically connected with the processor 13 and a Bluetooth signal transceiver 40. In this embodiment, the Bluetooth signal transceiver 40 is an external device of the computer 100 and is not embedded in the motherboard 10.

Figure 2A:
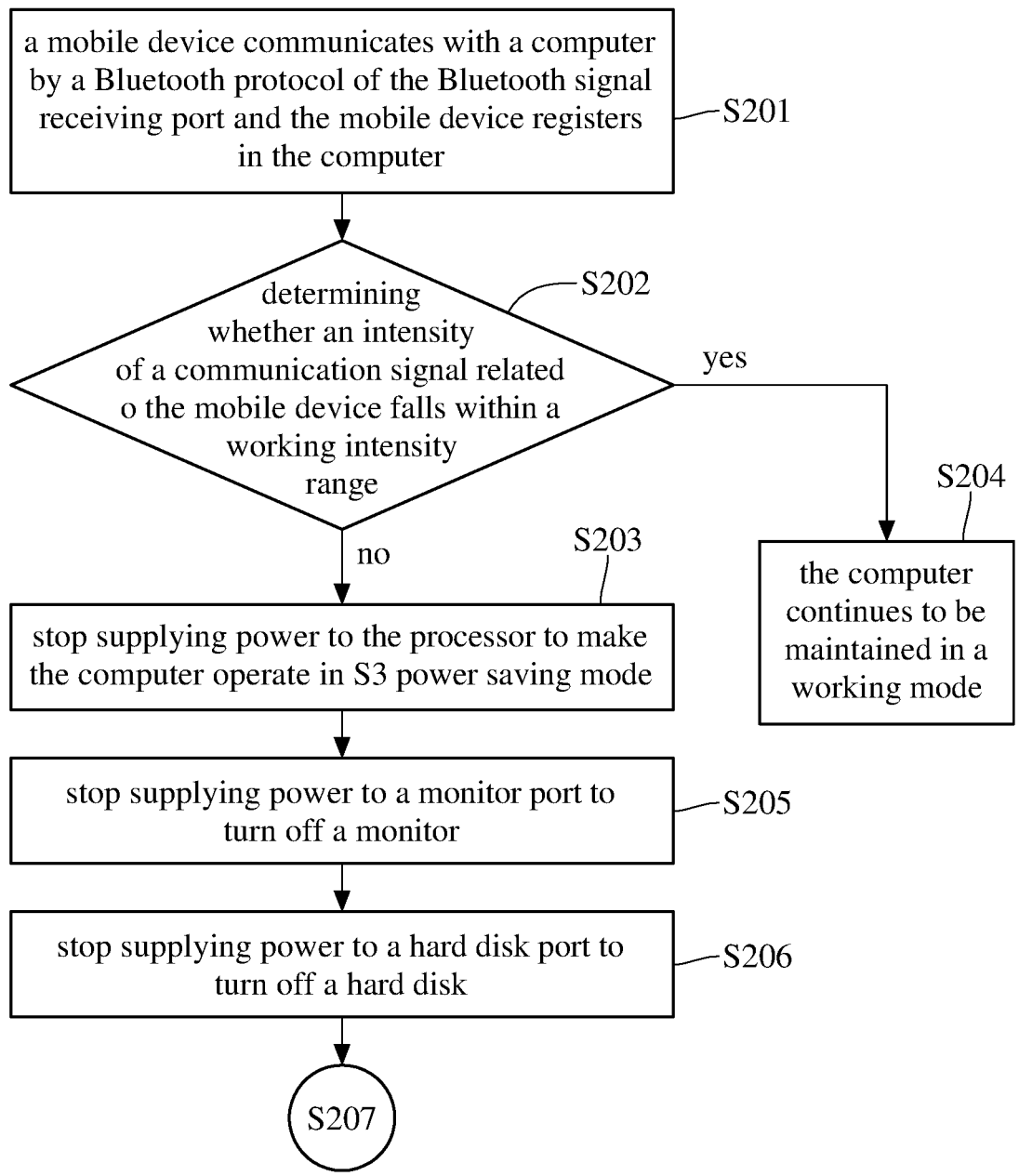
FIG. 2A and FIG. 2B illustrate a flow char of a power saving method according to a first embodiment of the present disclosure.
Figure 2B:
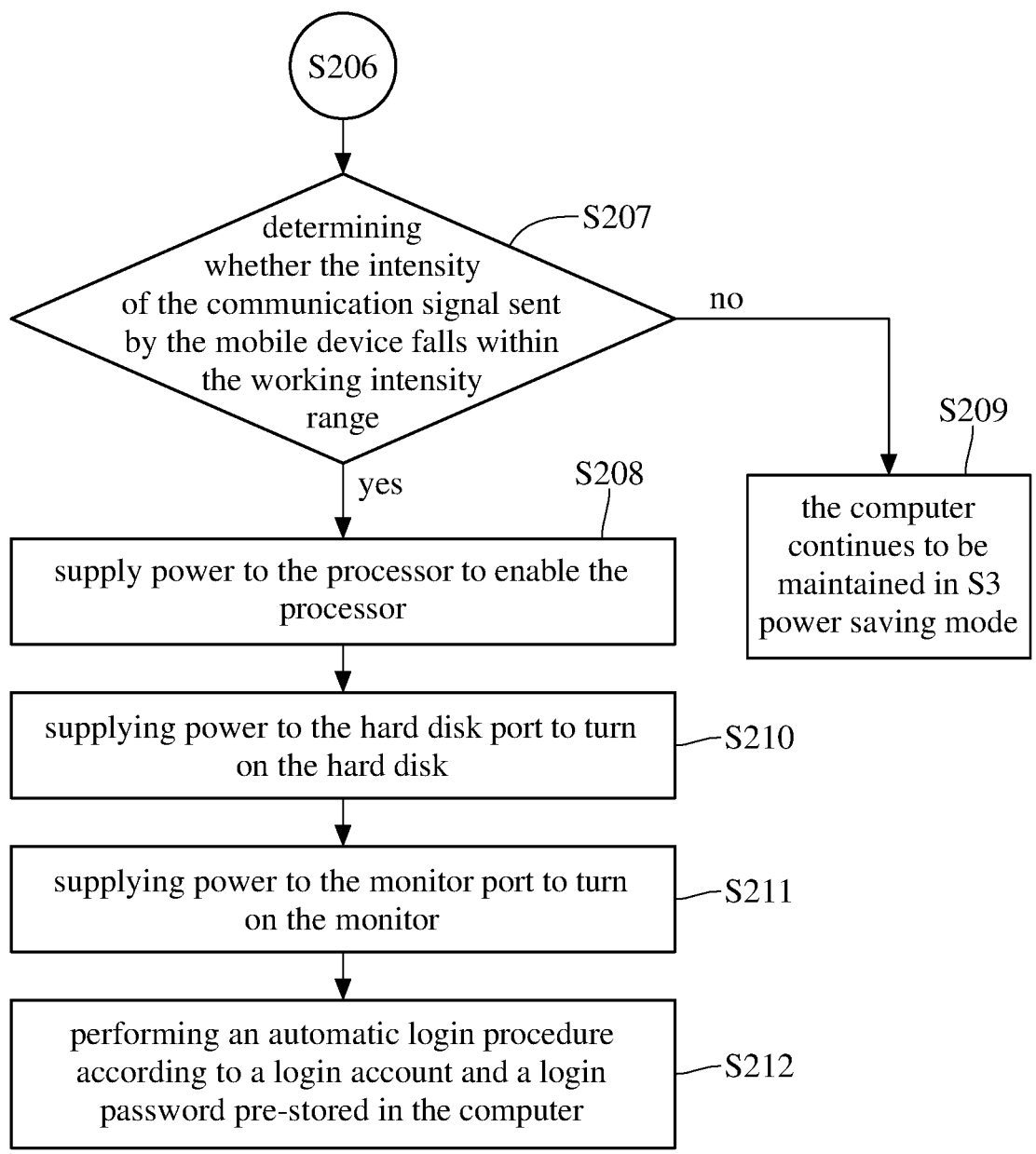

FIG. 2A and FIG. 2B illustrate a flow char of a power saving method according to a first embodiment of the present disclosure, and the power saving method shown in FIG. 2A and FIG. 2B may be performed with the computer 100 shown in FIG. 1. In conjunction with FIG. 1 and FIG. 2A, in step 201, a mobile device 200 communicates with the computer 100 by a Bluetooth protocol of the Bluetooth signal receiving port 16 and the mobile device 200 registers in the computer 100. Then in step 202, the Bluetooth signal transceiver 40 presets a working intensity range, the Bluetooth signal transceiver 40 is configured to receive a communication signal CS sent by the mobile device 200 and to transmit the communication signal CS to the Bluetooth signal receiving port 16, and to determine whether the intensity of the communication signal CS related to the mobile device 200 obtained by the Bluetooth signal receiving port falls within the working intensity range when the processor 13 of the computer 100 is enabled and the computer 100 is operated in the working mode. If the intensity of the communication signal CS fails to fall within the working intensity range, then proceed to step 203. If the intensity of the communication signal CS falls within the working intensity range, then proceed to step 204. Moreover, the Bluetooth signal receiving port 16 further transmits the communication signal CS to the power management controller 12.

In step 203, when the intensity of the communication signal CS obtained by the Bluetooth signal receiving port 16 fails to fall within the working intensity range, the main reason may generally be that the mobile device 200 is too far away from the computer 100. At this time, the power management controller 12 stops supplying power to the processor 13 to disable the processor 13 to make the computer 100 operate in S3 power saving mode (Suspend to RAM mode). In S3 power saving mode, the program instructions and the data operated by the computer 100 are stored in the random access memory 14, and the power management controller 12 continues to supply power to the random access memory 14. Otherwise, in step 204, the computer 100 continues to be maintained in the working mode.

Step 205 is followed by step 203. In step 205, the power management controller 12 stops supplying power to the monitor port 17 to turn off the monitor 50 electrically connected with the computer 100. In step 206, the power management controller 12 stops supplying power to the hard disk port 15 to turn off the hard disk 30 electrically connected with the computer 100. In other embodiments, Step 205 and step 206 can be performed simultaneously.

As shown in FIG. 1 and FIG. 2B, the computer power saving method of this embodiment further comprises steps 207 to 212. For conveniences of following descriptions, steps 207 to 212 are further defined as a computer waking method. When disabling the processor 13 of the computer 100 to make the computer 100 operate in S3 power saving mode, the trigger instructions for waking the computer 100 is the communication signal CS sent by the mobile device 200. Step 207 is determining whether the intensity of the communication signal CS obtained by the Bluetooth signal receiving unit 16 and sent by the mobile device 200 falls within the working intensity range. If the intensity of the communication signal CS falls within the working intensity range, then proceed to step 208; if the intensity of the communication signal CS does not fall within the working intensity range, then proceed to step 209. In step 208, the reason why the intensity of the communication signal CS obtained by the Bluetooth signal receiving unit 16 falls within the working intensity range may be that the distance between the mobile device 200 and the computer 100 is very short. At this time, the power management controller 12 restarts to supply power to the processor 13 to enable the processor 13. On the other hand, in step 209, when the intensity of the communication signal CS does not fall within the working intensity range, the computer 100 continues to be maintained in S3 power saving mode.

Step 210 is followed by step 208, and in step 210, after enabling the processor 13, the power management controller 12 restarts to supply power to the hard disk port 15 to turn on the hard disk 30 electrically connected with the computer 100 and to make the computer 100 operate in the working mode again. In step 211, the power management controller 12 restarts to supply power to the monitor port 17 to turn on the monitor 50 electrically connected with the computer 100. In other embodiments, step 210 and step 211 can be performed simultaneously. Step 212 is performing an automatic login procedure according to a login account and a login password pre-stored in the computer 100.

Figure 3A:
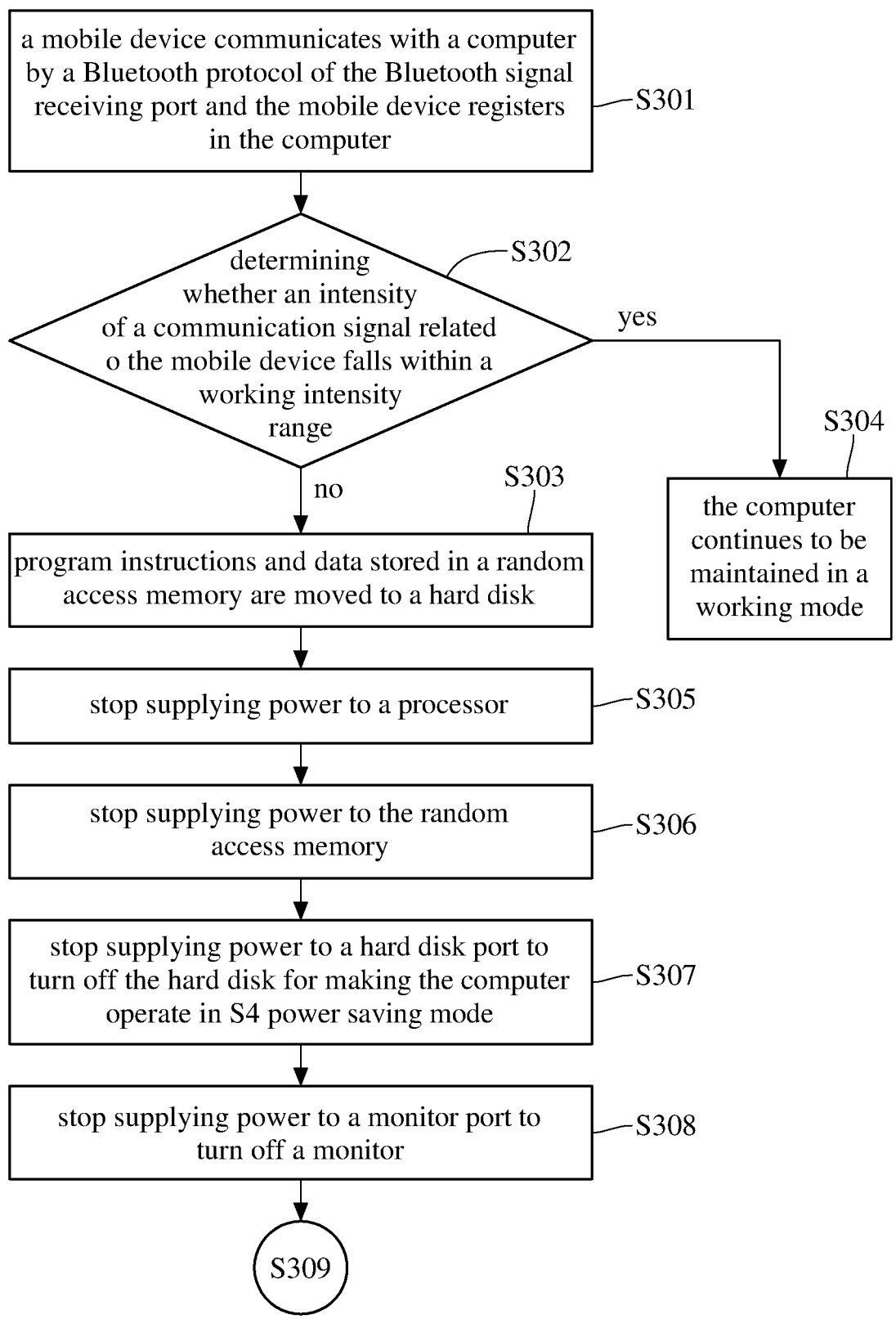
FIG. 3A and FIG. 3B illustrate a flow char of a power saving method according to a second embodiment of the present disclosure.
Figure 3B:
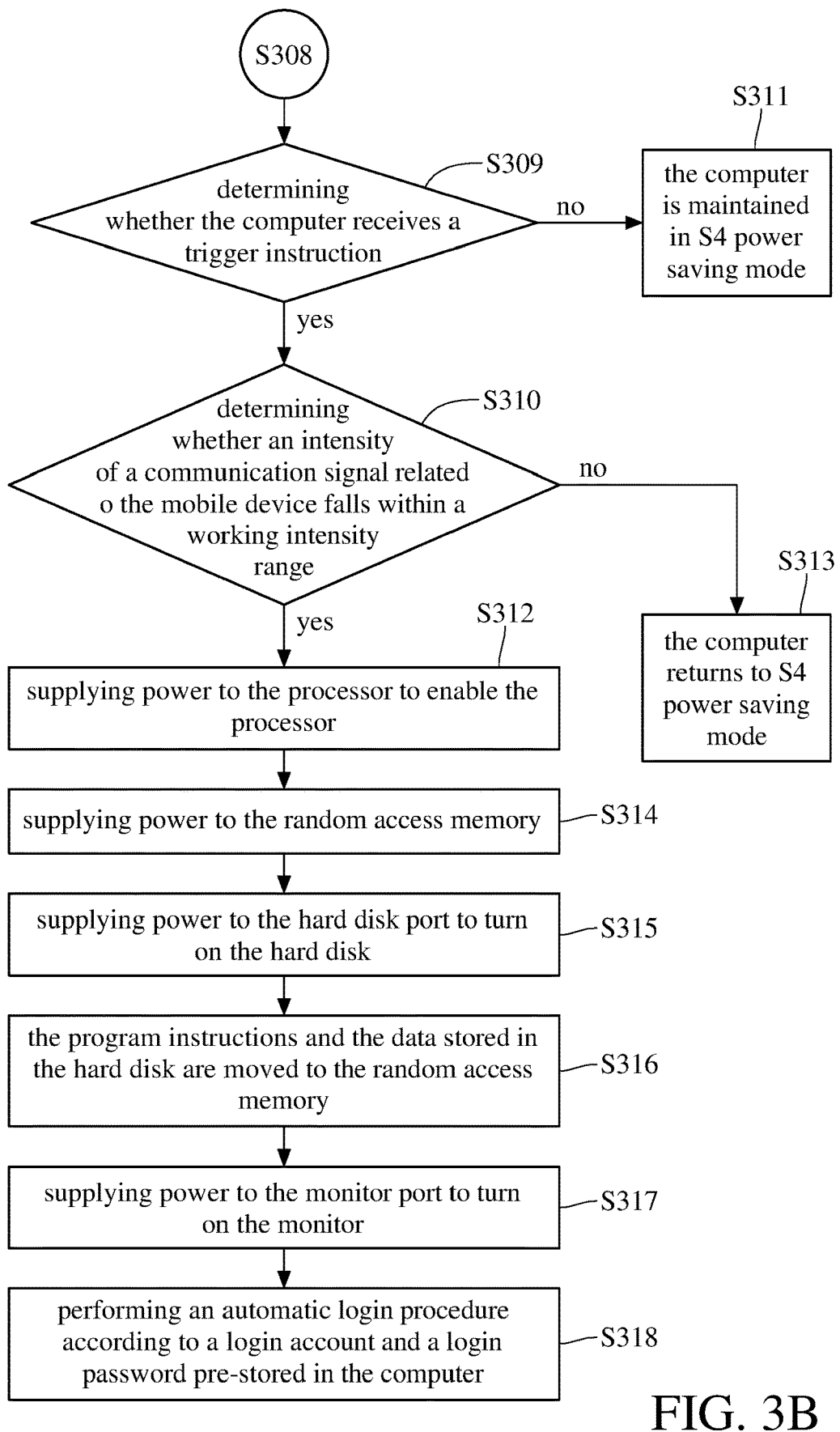

FIG. 3A and FIG. 3B illustrate a flow char of a power saving method according to a second embodiment of the present disclosure, and the power saving method shown in FIG. 3A and FIG. 3B may be performed with the computer 100 shown in FIG. 1. In step 301, the mobile device 200 communicates with the computer 100 by the Bluetooth protocol of the Bluetooth signal receiving port 16 and the mobile device 200 registers in the computer 100. Then step 302 is determining whether the intensity of the communication signal CS obtained by the Bluetooth signal receiving port 16 and sent by the mobile device 200 falls within the working intensity range when the processor 13 of the computer 100 is enabled and the computer 100 is operated in the working mode. If the intensity of the communication signal CS fails to fall within the working intensity range, then proceed to step 303. If the intensity of the communication signal CS falls within the working intensity range, then proceed to step 304.

In step 303, when the intensity of the communication signal CS obtained by the Bluetooth signal receiving port 16 fails to fall within the working intensity range, the program instructions and the data stored in the random access memory 14 are moved to the hard disk 30 by the processor 13. In step 304, the computer 100 continues to be maintained in the working mode.

Step 305 is followed by step 303. In step 305, the power management controller 12 stops supplying power to the processor 13 to disable the processor 13. In step 306, the power management controller 12 stops supplying power to the random access memory 14 for disabling the random access memory 14. In step 307, the power management controller 12 stops supplying power to the hard disk port 15 to turn off the hard disk 30 for making the computer 100 operate in S4 power saving mode (Hibernate mode). In Step 308, the power management controller 12 stops supplying power to the monitor port 17 to turn off the monitor 50 electrically connected with the computer 100.

As shown in FIG. 1 and FIG. 3B, the computer power saving method of this embodiment further comprises steps 309 to 315, and steps 309 to 315 are further defined as a computer waking method. When disabling the processor 13, the random access memory 14, and the hard disk 30 of the computer 100 to make the computer 100 operate in S4 power saving mode, the trigger instructions for waking the computer 100 is not the communication signal CS sent by the mobile device 200.

Step 309 is determining whether the computer 100 receives a trigger instruction, wherein the trigger instruction is generated by pressing a power switch of the computer 100. When the computer 100 receives the trigger instruction, the computer 100 will be waken from S4 power saving mode, then proceed to step 310. When the computer 100 does not receive the trigger instruction, then proceed to step 311. Step 310 is determining whether the intensity of the communication signal CS related to the mobile device 200 obtained by the Bluetooth signal receiving port 16 falls within the working intensity range after the computer 100 receives the trigger instruction. If the intensity of the communication signal CS falls within the working intensity range, then proceed to step 312. If the intensity of the communication signal CS fails to fall within the working intensity range, then proceed to step 313. In step 311, the computer 100 is maintained in S4 power saving mode.

In step 312, when the computer 100 receives the trigger instruction and the intensity of the communication signal CS falls within the working intensity range, the power management controller 12 will restart to supply power to the processor 13 to enable the processor 13. In step 313, the computer 100 returns to S4 power saving mode.

Step 314 is followed by step 312. In step 314, the power management controller 12 restarts to supply power to the random access memory 14 for enabling the random access memory 14. In step 315, the power management controller 12 restarts to supply power to the hard disk port 15 to turn on the hard disk 30 for making the computer 100 operate in the working mode. In step 316, the program instructions and the data stored in the hard disk 30 are moved to the random access memory 14 by the processor 13. In step 317, the power management controller 12 restarts to supply power to the monitor port 17 to turn on the monitor 50 electrically connected with the computer 100. Step 318 is performing an automatic login procedure according to a login account and a login password pre-stored in the computer 100.

Figure 4:
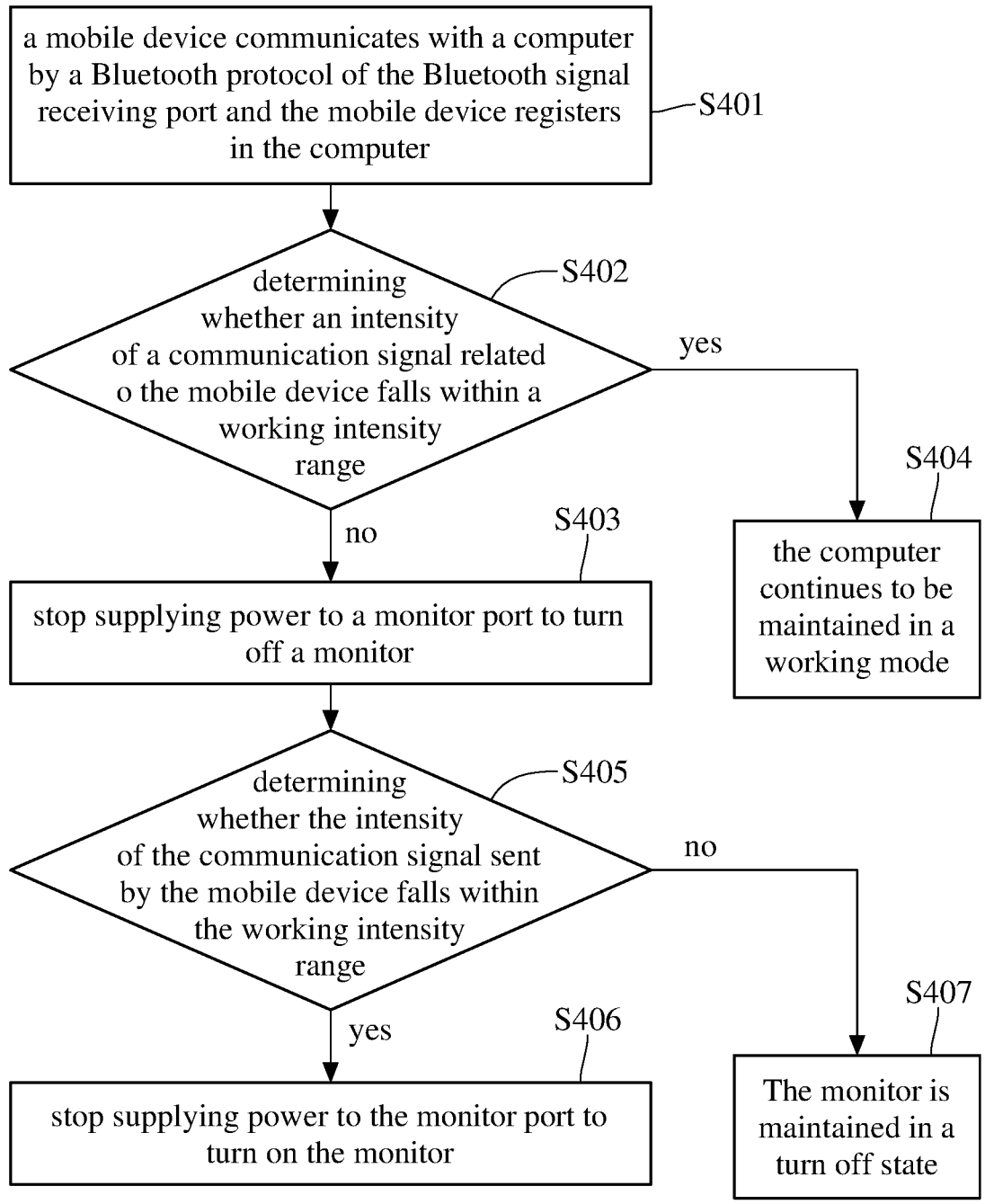
FIG. 4 illustrates a flow char of a power saving method according to a third embodiment of the present disclosure.

FIG. 4 illustrate a flow char of a power saving method according to a third embodiment of the present disclosure, and the power saving method shown in FIG. 4 may be performed with the computer 100 shown in FIG. 1. Steps 401 to 406 of the computer power saving method according to the third embodiment are respectively identical to steps 201, 202, 205, 204, 207 and 211 of the computer power saving method according to the first embodiment. Differences between the third embodiment and the first embodiment are that the power management controller 12 continues to supply power to the processor 13 and the hard disk 30, and only stops supplying power to the monitor port 17 for turning off the monitor 50 electrically connected with the computer 100. Therefore, the power management controller 12 only restarts to supply power to the monitor port 17 to turn on the monitor 50 electrically connected with the computer 100 for waking the computer 100.

Figure 5:
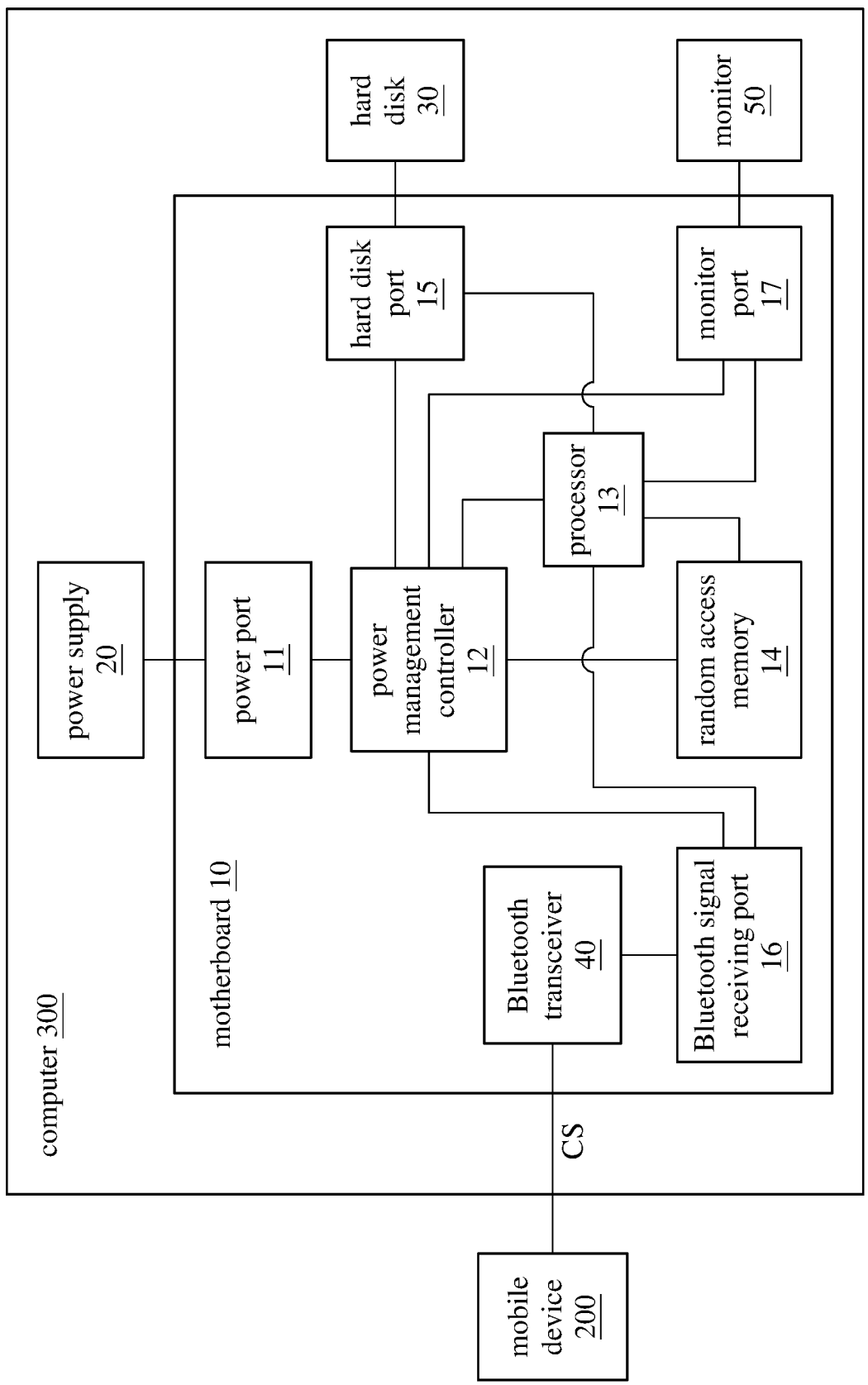
FIG. 5 is a hardware architecture diagram of a computer with a power saving function according to another embodiment of the present disclosure.

The computer power saving methods according to the first to third embodiments may also be performed with another computer having different hardware architecture. FIG. 5 is a hardware architecture diagram of a computer with a power saving function according to another embodiment of the present disclosure. A difference between a hardware architecture of a computer 300 and the hardware architecture of the computer 100 is that the Bluetooth signal transceiver 40 is embedded in the motherboard 10 and is electrically connected with the Bluetooth signal receiving port 16. The computer power saving methods according to the first to third embodiments can be performed with the computer 300, and the operation and principle thereof are the same as described above.

In the past, the computer is switched from the working mode to the power saving mode according to how long input interfaces of the computer are not activated. Therefore, the computer may wrongly determine that a user has left away the computer even if the user actually does not leave away the computer. With the computer power saving method and the computer waking method of the present disclosure, the computer is switched between the working mode and the power saving mode according to whether the intensity of the communication signal related to the registered mobile device obtained by the Bluetooth signal receiving port falls within the working intensity range, such that it is precisely determined whether a user leaves away the computer for saving power.

What is claimed is:

1. A computer waking method, applied to a computer having a Bluetooth signal receiving port, with the computer waking method comprising:
    determining whether the computer receives a trigger instruction generated by pressing a power switch of the computer when a processor of the computer stops working and the computer is in a power saving mode;
    determining whether an intensity of a communication signal related to a registered mobile device obtained by the Bluetooth signal receiving port falls within a working intensity range after the computer receives the trigger instruction;
    enabling the processor to make the computer operate in a working mode when the computer receives the trigger instruction and the intensity of the communication signal falls within a working intensity range;
    enabling a random access memory and a hard disk after enabling the processor; and
    moving program instructions and data stored in the hard disk to the random access memory via the processor.

2. The method in claim 1, wherein the power saving mode of the computer is a hibernate mode when the computer is operated in the power saving mode.

3. The method in claim 1, further comprising performing an automatic login procedure according to a login account and a login password pre-stored in the computer after the computer is operated in the working mode.

4. The method in claim 1, wherein the Bluetooth signal receiving port is a USB port, and the USB port is configured to connect with a Bluetooth signal transceiver.

5. The method in claim 1, wherein the Bluetooth signal receiving port is a Peripheral Component Interconnect Express port, and the Peripheral Component Interconnect Express port is configured to connect with a Bluetooth signal transceiver.

6. The method in claim 1, wherein the Bluetooth signal receiving port is a Mini PCI Express port, and the Mini PCI Express port is configured to connect with a Bluetooth signal transceiver.

7. A computer power saving method, applied to a computer having a Bluetooth signal receiving port, with the computer power saving method comprising:
    communicating a mobile device with the computer by a Bluetooth protocol of the Bluetooth signal receiving port and registering the mobile device in the computer;
    determining whether an intensity of a communication signal related to a registered mobile device obtained by the Bluetooth signal receiving port falls within a working intensity range when a processor of the computer is enabled to make the computer operate in a working mode;
    moving program instructions and data stored in a random access memory to a hard disk by the processor when the intensity of the communication signal fails to fall within the working intensity range;
    disabling the processor to make the computer operate in a power saving mode when the intensity of the communication signal fails to fall within a working intensity range;
    disabling the random access memory and the hard disk after disabling the processor;
    determining whether the computer receives a trigger instruction generated by pressing a power switch of the computer when the processor of the computer stops working and the computer is operated in a power saving mode;
    determining whether an intensity of a communication signal related to a registered mobile device obtained by the Bluetooth signal receiving port falls within a working intensity range after the computer receives the trigger instruction; and
    enabling the processor to make the computer operate in the working mode when the computer receives the trigger instruction and the intensity of the communication signal falls within the working intensity range;
    enabling the random access memory and the hard disk after enabling the processor; and
    moving the program instructions and the data stored in the hard disk to the random access memory via the processor.

8. The method in claim 7, wherein the power saving mode of the computer is a hibernate mode when the computer is operated in the power saving mode.

9. The method in claim 7, further comprising performing an automatic login procedure according to a login account and a login password pre-stored in the computer after the computer is operated in the working mode.

10. The method in claim 7, wherein the Bluetooth signal receiving port is a USB port, and the USB port is configured to connect with a Bluetooth signal transceiver.

11. The method in claim 7, wherein the Bluetooth signal receiving port is a Peripheral Component Interconnect Express port, and the Peripheral Component Interconnect Express port is configured to connect with a Bluetooth signal transceiver.

12. The method in claim 7, wherein the Bluetooth signal receiving port is a Mini PCI Express port, and the Mini PCI Express port is configured to connect with a Bluetooth signal transceiver.

13. The method in claim 7, further comprising turning off a monitor electrically connected with the computer after disabling the processor to make the computer operate in the power saving mode; and further comprising turning on the monitor electrically connected with the computer after enabling the processor to make the computer operate in the working mode.

* * * * *